United States Patent [19]

Maeda

[11] Patent Number: 4,681,648
[45] Date of Patent: Jul. 21, 1987

[54] PROCESS FOR PRODUCING CUSHIONING LAMINATE

[75] Inventor: Atsushi Maeda, Mie, Japan

[73] Assignee: Mitsubishi Yuka Badische Co., Ltd., Yokkaichi, Japan

[21] Appl. No.: 714,267

[22] Filed: Mar. 21, 1985

[30] Foreign Application Priority Data

May 16, 1984 [JP] Japan ................................. 59-98313

[51] Int. Cl.$^4$ ............................................. B32B 31/20
[52] U.S. Cl. ................................. 156/210; 156/244.11; 156/244.24; 156/245; 156/285; 156/292
[58] Field of Search ............... 156/210, 244.11, 244.14, 156/244.24, 285, 245, 147, 292; 53/79, 403, 405, 408, 432, 433, 511

[56] References Cited

U.S. PATENT DOCUMENTS

| | | | |
|---|---|---|---|
| 3,124,807 | 3/1964 | Frenkel et al. | 156/285 |
| 3,142,599 | 7/1964 | Chavannes | 156/285 |
| 3,234,065 | 2/1966 | Best | 156/285 |
| 3,285,793 | 11/1966 | Chavannes | 156/292 |
| 3,346,438 | 10/1967 | Chavannes | 156/292 |
| 3,508,992 | 4/1970 | Chavannes | 156/292 |
| 3,589,976 | 6/1971 | Erb | 156/244.11 |
| 3,655,486 | 4/1972 | Hagino et al. | 156/285 |
| 3,674,109 | 7/1972 | Murase | 156/285 |
| 3,756,884 | 9/1973 | Hagino | 156/285 |
| 3,882,219 | 5/1975 | Wiley | 156/244.11 |
| 4,224,092 | 9/1980 | Thompson et al. | 156/244.24 |
| 4,412,879 | 11/1983 | Ottsuiano | 156/292 |

Primary Examiner—Caleb Weston
Attorney, Agent, or Firm—Oblon, Fisher, Spivak, McClelland, & Maier

[57] ABSTRACT

A process for producing a cushioning laminate is described, comprising melting a laminated sheet comprising (a) a thermoplastic resin substrate sheet and (b) a thermoplastic resin adhesive layer having a heat distortion temperature at least 25° C. lower than that of the thermoplastic resin which constitutes the substrate sheet (a); moving the laminated sheet below an upper mold in such a manner that the substrate sheet (a) faces the upper mold; vacuum molding the laminated sheet using the upper mold to produce a molded article having a desired irregular surface; and then bonding a plate-shaped member, such as a cardboard plate, a metallic or plastic plate, to the adhesive layer (b) of the laminated sheet while the above-molded article is brought into close contact with the upper mold, thereby producing the cushioning laminate having enclosed air pockets. This cushioning laminate is useful as a cushioning material for wrapping.

8 Claims, 7 Drawing Figures

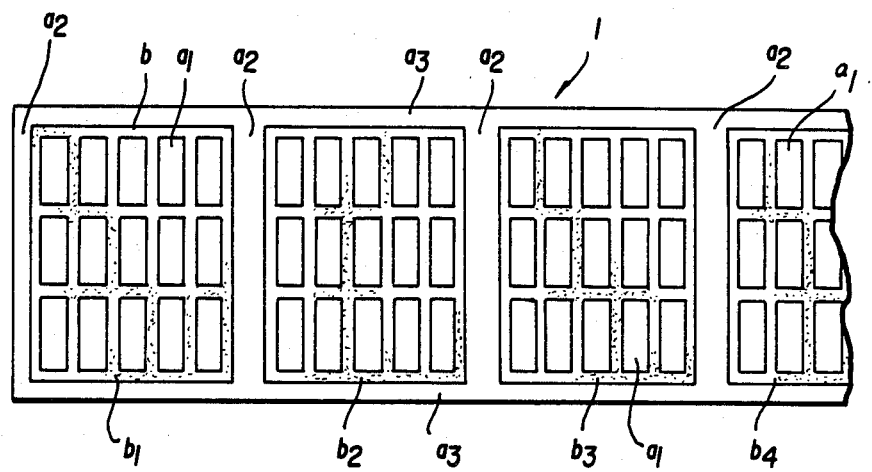
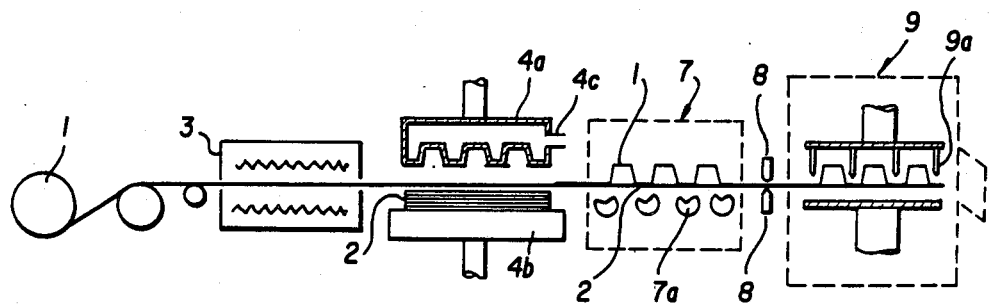

PROCESS FOR PRODUCING CUSHIONING LAMINATE

FIELD OF THE INVENTION

The present invention relates to a process for producing a cushioning laminate which is useful as a cushioning material for wrapping.

BACKGROUND OF THE INVENTION

It is known that cushioning materials are produced by integrally bonding a paper or rigid resin plate and a vacuum molded article of a resin sheet. Japanese Patent Publication No. 47335/83 and U.S. Pat. No. 3,674,109 disclose a method for producing a container with a cover or a cushioning material which comprises superimposing an air-impermeable sheet made of a thermoplastic resin and a paper having microholes and with a synthetic resin film laminated thereon or rigid resin plate which comprises bringing the air-impermeable sheet into contact with a mold, heating the assembly at a temperature higher than the heat distortion temperature of the air-impermeable sheet, and then vacuum molding only the air-impermeable sheet along the mold.

In producing a box using the cushioning material produced by the above vacuum molding method, however, the paper with printing applied thereon appears outside and the microholes of the paper give a singular feeling to the consumer.

SUMMARY OF THE INVENTION

The present invention is intended to overcome the above problem and an object of the present invention is to provide a process for producing a cushioning laminate using a paper which does not have microholes.

The process for producing a cushioning laminate according to the present invention comprises: heat-melting a laminated sheet comprising (a) a thermoplastic resin substrate sheet and (b) a thermoplastic resin adhesive layer having a heat distortion temperature at least 25° C. lower than that of the thermoplastic resin which constitutes the substrate sheet (a), moving the laminated sheet below an upper mold in such a manner that the substrate sheet (a) is positioned so as to face the upper mold, vacuum-molding the laminated sheet using the upper mold to produce a molded article having a desired irregular surface, and bonding a plate-shaped member selected from the group consisting of a cardboard plate, a metallic plate and a plate of a resin having a heat distortion temperature higher than that of the resin which constitutes the adhesive layer (b) to the adhesive layer (b) of the laminated sheet while the above-molded article is brought into close contact with the upper mold, thereby producing the cushioning material having closed air pockets.

BRIEF DESCRIPTION OF THE DRAWINGS

FIG. 1 is a cross-sectional view of a laminated sheet which is used in the present invention;

FIG. 2 is a top plan view of the laminated sheet;

FIG. 3 is a diagrammatic illustration of an apparatus for use in the practice of the process of the present invention;

DETAILED DESCRIPTION OF THE INVENTION

Figure 4:
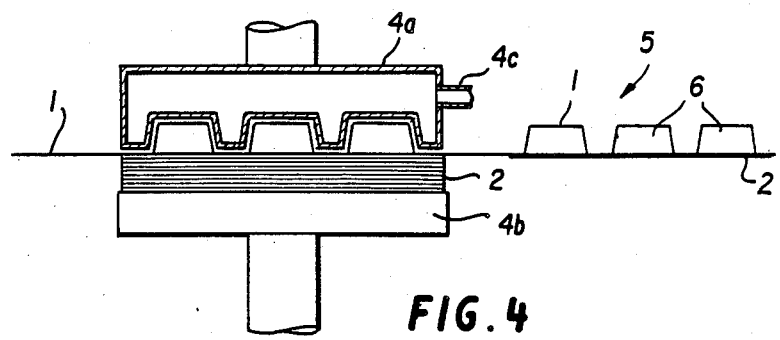
FIG. 4 is an enlarged view of a unit of the apparatus shown in FIG. 3.

The thermoplastic resin for the substrate sheet (a) of the laminated sheet is a crystalline resin or amorphous resin, each having a relatively high melting point of 120° to 265° C. and having rigidity. Examples of the crystalline resin include polypropylene, high density polyethylene, polyethylene terephthalate, polycarbonate, polyamide, and a saponified product of an ethylene/vinyl acetate copolymer, and examples of the amorphous resin include high impact polystyrene, rigid polyvinyl chloride, foamed polystyrene, an acrylonitrile/butadiene/styrene copolymer, and a styrene/butadiene/styrene copolymer. Those resins can be used alone or in combinations thereof.

Examples of the thermoplastic resin which can be used in the preparation of the adhesive layer (b) include low density polyethylene, low molecular weight soluble linear polyesters, a vinyl chloride/vinyl acetate copolymer, polyvinyl acetate, an ethylene/vinyl acetate copolymer (ethylene content: 55–85 wt %), chlorinated polypropylene, chlorinated polyethylene, an ethylene/(meth)acrylic acid copolymer or its metal salts (Na, Li, K, Zn), and an ethylene/(meth)acrylic acid lower ester copolymer.

The heat distortion temperature of the thermoplastic resin for the adhesive layer (b) must be at least 25° C. lower than that of the thermoplastic resin for the substrate sheet (a). The reason for this is that after vacuum molding the laminate sheet is bonded to a plate-shaped member having a high stiffness, such as a cardboard or a metallic plate, and the adhesive layer of the laminated sheet which is softened or melted serves as an adhesive for this adhesion.

The laminated sheet comprising a polystyrene foamed sheet and an ethylene/vinyl acetate copolymer film is preferred.

The laminated sheet can be produced by a method wherein thermoplastic resins for the substrate sheet (a) and the adhesive layer (b) are fed to a die through different extruders and then co-extruded, or a method wherein an anchor coating agent is coated on the surface of a substrate sheet which has been extrusion-molded and a film made of the resin for the adhesive layer is melt laminated thereon. Prior to vacuum molding, the laminated sheet is passed through a heating chamber and moved below the upper mold by means of, for example, a chain. Therefore, in order to prevent the molten resin for the adhesive layer from attaching to the chain, it is desirable that the width of the adhesive layer (b) be made narrower than that of the substrate sheet (a) as shown in FIG. 1.

In addition, the laminated sheet can be produced by coating an aqueous emulsion or organic solvent solution of the resin for the adhesive layer (b) on the surface of the substrate sheet (a) and then drying. Such an aqueous emulsion can be prepared by the methods described in Japanese Patent Application (OPI) Nos. 2149/81, 76049/82 and 120655/83 and Japanese Patent Application Nos. 113229/82 and 188536/82 (the term "OPI" as used herein refers to a "published unexamined Japanese patent application").

When the liquid adhesive is used, it is not necessary to coat on the whole surface of the substrate sheet. From a viewpoint of production costs, it is advantageous that the liquid adhesive be partially coated as shown in FIG. 2 using, for example, a gravure printing roll or a flexo printing roll, thereby producing a laminated sheet with areas ($a_1$, $a_2$, $a_3$) where the adhesive layer is not provided. In FIG. 2, $b_1$, $b_2$, $b_3$, $b_4$, ... indicate partially coated adhesive layers each being prepared by one shot; $a_2$ indicates boundaries between the partially coated adhesive layers, i.e., with no adhesive layer coated thereon; and $a_3$ indicates areas with no adhesive layer coated thereon and which are clamped with the chain.

The liquid adhesive is usually controlled so that the resin content is from 1 to 60% by weight and preferably from 5 to 50% by weight and the Brookfield viscosity is from 10 to 1,000 poises.

The amount of the liquid adhesive coated on the laminated sheet is from 0.1 to 10 $g/m^2$ as the resin solids content.

The thickness of the substrate sheet is from 0.15 to 2 mm when the sheet is an unfoamed sheet and from 0.3 to 4 mm when the sheet is a foamed sheet (density: 0.02–0.1 $g/cm^3$), and the thickness of the adhesive layer is from 1 to 60 microns.

Examples of the plate-shaped member (2) which is bonded to the laminated sheet (1) include a cardboard, a corrugated cardboard, a metallic sheet (such as an aluminum sheet and a copper plate), plates made of thermosetting resins such as a phenol resin, an epoxy resin and a melamine resin, and sheets made of rigid thermoplastic resins such as polyvinyl chloride, polypropylene, polyamide, polyethylene terephthalate and polycarbonate.

A process for producing a cushioning laminate according to the present invention will hereinafter be explained by reference to the apparatus shown in FIG. 3.

A laminated sheet 1 is transferred to a heating chamber 3 by a chain (not shown) where a substrate sheet and an adhesive layer of the laminated sheet 1 are melted. The molten laminated sheet 1 is positioned below an upper mold 4a by moving the chain by a distance corresponding to one shot. The pressure in the chamber of the upper mold 4a is reduced by means of a pipe 4c connected to a vacuum pump (not shown), and the laminated sheet is shaped into a desired form by vacuum molding (see FIG. 4). A paper-feeding unit 4b is placed below the upper mold 4a and designed to move upwardly and downwardly by means of an air cylinder. A cardboard 2 is placed on the paper-feeding unit 4b. While the laminated sheet is brought into close contact with the upper mold 4a, the paper-feeding unit 4b is raised and the cardboard 2 is bonded to the laminated sheet 1 molded into the desired form (see FIG. 4). This adhesion results in the formation of air pockets 6—6 in the cushioning material 5, enclosed by the cardboard 2 and the laminated sheet 1 molded in the desired form. These enclosed air pockets provide the cushioning material 5 with cushioning properties.

After the laminated sheet 1 and the cardboard 2 are bonded together, the resulting cushioning material 5 is cooled by jetting air from a cooling air-spraying device 7a in a cooling chamber 7 provided if desired and necessary and then trimmed by means of a cutter knife 9a and two plateweights 8—8 in a trimming chamber 9 by one shot.

An embodiment in which the above-produced cushioning material is used as a wrapping material for set-up boxes will be explained hereinafter.

Figure 5:
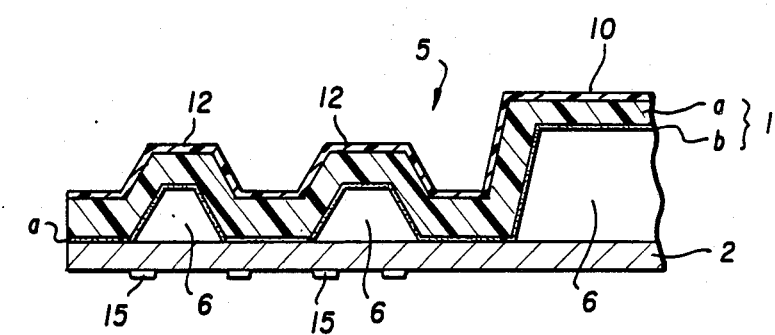
FIG. 5 is a partial cross-sectional view of a wrapping material.
Figure 6:
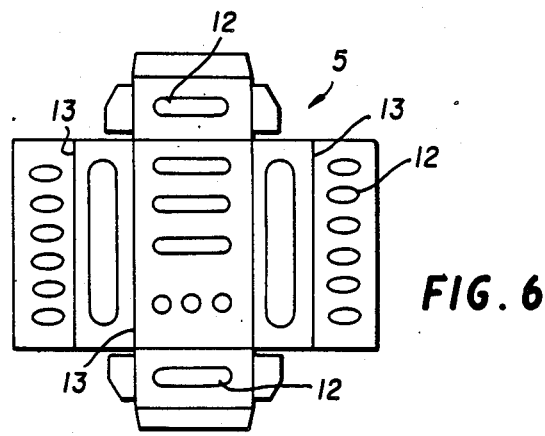
FIG. 6 is a top plan view of the wrapping material shown in FIG. 5.

FIG. 5 is a partial cross-sectional view of a wrapping material 5 and the top plan view of the wrapping material 5 is shown in FIG. 6. A stiff cardboard 2 is provided with a printing coating 15 on the surface thereof. An adhesive layer a is an ethylene/vinyl acetate copolymer film having a thickness of 30 microns. A vacuum molded product 1 of a polystyrene foamed sheet (thickness: 2 mm) having a bulk density of from 0.03 to 0.5 $g/cm^3$ is bonded to the cardboard 2 through the adhesive layer a. A polyolefin sheet 10 made of an ethylene/vinyl acetate copolymer and having a thickness of about 100 microns is bonded to the polystyrene foamed sheet 1, thereby constituting an outer, lustrous layer. Enclosed air pockets 11—11 are formed by the cardboard 2 and projections 12—12 of the molded sheet 1, a, 10.

Figure 7:
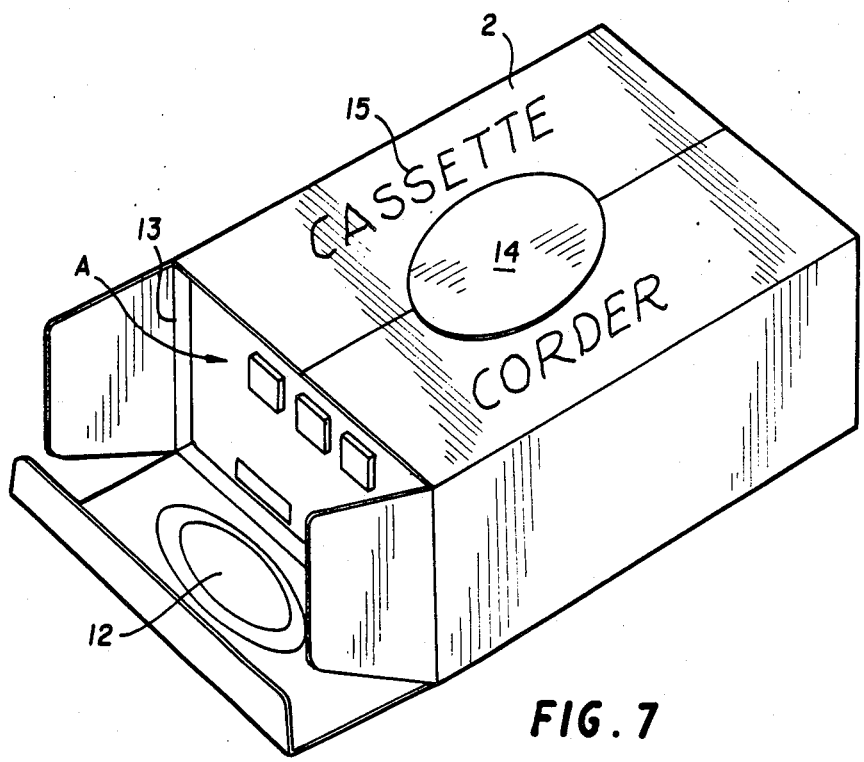
FIG. 7 is a perspective view of a wrapping container prepared by the cushioning material of the present invention.

After an article A is placed on the cardboard, the wrapping material is folded along lines 13—13 in such a manner that the cardboard 2 appears outside and the polyolefin sheet 10 appears inside, and then a sealing label 14 is attached (see FIG. 7). The article A is protected by the polystyrene foamed material and air pockets.

The present invention is described in greater detail by reference to the following examples.

PREPARATION EXAMPLE

Preparation of Aqueous Dispersion of Ethylene/Vinyl Acetate Copolymer

An ethylene/vinyl acetate copolymer (vinyl acetate content: 28% by weight) was fed at a rate of 100 parts by weight per hour from a hopper of a corotating, intermeshing-type twin-screw extruder. An aqueous solution of an N,N-dimethylaminoethyl methacrylate/butyl methacrylate/lauryl methacrylate (0.4:0.5:0.1 by mol) which had been neutralized with formic acid (solids content: 35%) was continuously introduced at a rate of 22.9 parts by weight per hour from the first inlet, and water was continuously introduced at a rate of 147.1 parts by weight per hour from the second inlet. The mixture was then extruded at a temperature of 130° C. to produce a milky white aqueous dispersion (solids content: 50% by weight).

EXAMPLE 1

A laminated sheet of a foamed polystyrene paper (density: 0.08 $g/cm^3$, thickness: 2.5 mm) and an ethylene/vinyl acetate copolymer film (thickness: 30 microns) was introduced into a heating chamber maintained at 200° C. and melted by heating with an infrared ray heater.

The molten laminated sheet was vacuum molded using an upper mold (degree of reduction in pressure: −450 mmHg).

While the above-molded laminated sheet was brought into close contact with the upper mold, a paper-feeding unit was moved upwardly by means of an air cylinder to thereby bond the uppermost cardboard and the laminated sheet.

The paper-feeding unit was lowered while on the other hand the upper mold was raised to remove the resulting cushioning material from the upper mold. The cushioning material was then cooled and trimmed to obtain the desired product.

EXAMPLE 2

A cushioning material was produced in the same manner as in Example 1 except that a partially coated polypropylene sheet produced by coating a 600 micron thick polypropylene sheet with the aqueous emulsion prepared in Preparation Example as shown in FIG. 2 was used as the laminated sheet.

While the invention has been described in detail and with reference to specific embodiments thereof, it will be apparent to one skilled in the art that various changes and modifications can be made therein without departing from the spirit and scope thereof.

What is claimed is:

1. A process for producing a cushioning laminate which comprises:
   heat-melting a laminated sheet comprising (a) a rigid thermoplastic resin formed polystyrene substrate sheet and (b) a thermoplastic resin adhesive layer having a heat distortion temperature at least 25° C. lower than that of the thermoplastic resin which constitutes the substrate sheet (a),
   moving the laminate sheet below an upper mold in such a manner that the substrate sheet (a) is positioned so as to face the upper mold,
   vacuum molding the laminated sheet using the upper mold to produce a molded article having a desired irregular surface, and
   bonding a cardboard plate-shaped member having a high stiffness to the adhesive layer (b) of the laminated sheet while the above-molded article is brought into close contact with the upper mold by vertically raising said cardboard plate-shaped member to contact the adhesive layer, thereby producing the cushioning laminate having closed air pockets.

2. The process of claim 1, wherein the thickness of the substrate sheet is 0.3 to 4 mm.

3. The process of claim 1, wherein the thickness of the adhesive layer is 1 to 60 microns.

4. The process of claim 1, wherein the thermoplastic resin for the adhesive layer (b) is selected from the group consisting of low density polyethylene, low molecular weight soluble linear polyesters, a vinyl chloride/vinyl acetate copolymer, polyvinyl acetate, an ethylene/vinyl acetate copolymer, chlorinated polypropylene, chlorinated polyethylene, an ethylene/(meth)acrylic acid copolymer or its metal salts, and an ethylene/(meth)acrylic acid lower ester copolymer.

5. The process of claim 1, wherein the laminated sheet comprises a polystyrene foamed sheet and an ethylene/vinyl acetate copolymer film.

6. The process of claim 1, wherein the laminated sheet is prepared by feeding the thermoplastic resins for the substrate sheet (a) and the adhesive layer (b) to a die through different extruders and coextruding.

7. The process of claim 1, wherein the laminated sheet is prepared by coating an anchor coating agent on the surface of an extrusion molded substrate sheet and melt laminating a resin film for the adhesive layer.

8. The process of claim 1, wherein the laminated sheet is prepared by coating an aqueous emulsion or organic solvent solution of a resin for the adhesive layer (b) on the surface of the substrate sheet (a) and drying.

* * * * *